Jan. 19, 1965  R. A. LOCKWOOD  3,166,394
SELF-DUMPING CENTRIFUGAL SEPARATOR
Filed April 12, 1961  2 Sheets-Sheet 1

INVENTOR.
R. ADDIS LOCKWOOD
BY
ATTORNEY

Jan. 19, 1965  R. A. LOCKWOOD  3,166,394
SELF-DUMPING CENTRIFUGAL SEPARATOR
Filed April 12, 1961  2 Sheets—Sheet 2
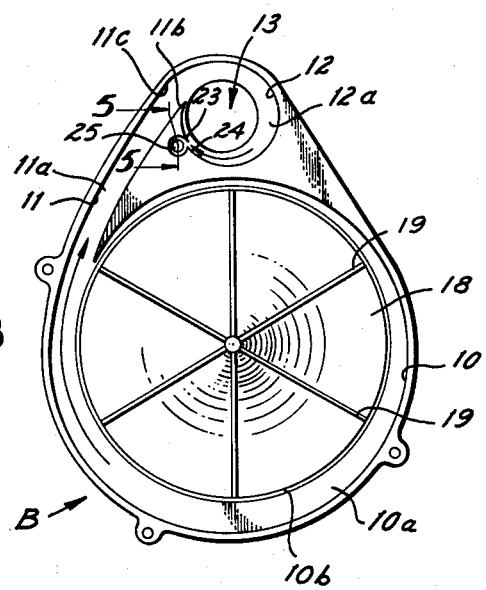
FIG. 3
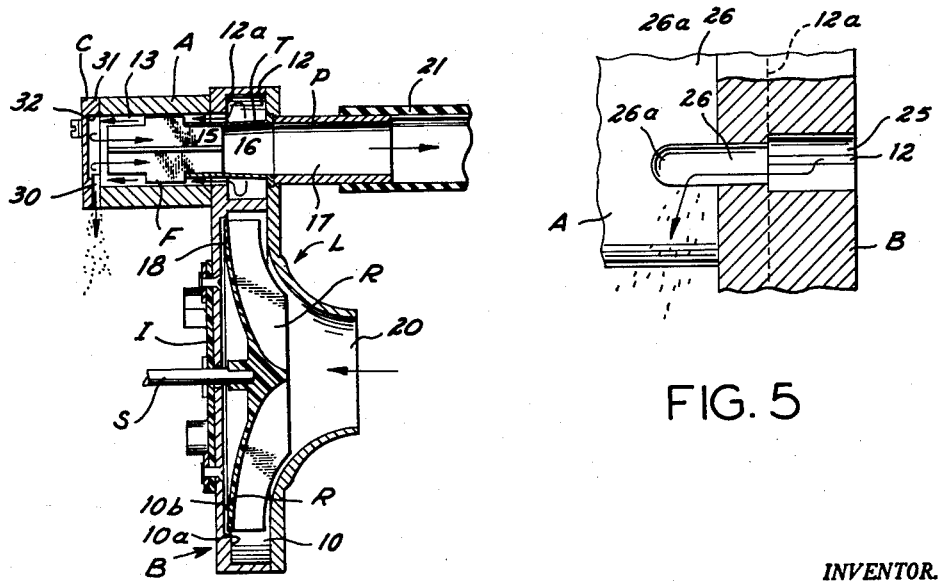
FIG. 4
FIG. 5
INVENTOR.
R. ADDIS LOCKWOOD
BY Gene W. Arnt
ATTORNEY United States Patent Office 3,166,394
Patented Jan. 19, 1965

3,166,394
SELF-DUMPING CENTRIFUGAL SEPARATOR
Robert Addis Lockwood, Reseda, Calif., assignor, by mesne assignments, to Arthur R. Adams, Glendale, Calif.
Filed Apr. 12, 1961, Ser. No. 102,536
6 Claims. (Cl. 55—416)

The present invention relates to a centrifugal separator which is self-dumping and requires no moving parts for its operation.

The presently preferred form of the invention is utilized for separating dust and other particles from air. However, the novel principles of the invention are believed to be applicable in separating heavy particulate material from any type of fluid whether in the liquid or gaseous state.

Numerous types of mechanical separators have been devised heretofore, all of which have, however, been subject to a number of disadvantages. As applied to the separation of particles from air, for example, one disadvantage has been the limited ability of the separators to remove fine particles. Another disadvantage of such separators has been that those without moving parts require periodic disassembly and cleaning, while those having moving parts are subject to wear and the corresponding maintenance problems.

One object of the present invention, therefore, is to provide a mechanical separator having no moving parts which is capable of separating high-density particles from a moving stream of fluid, and which continuously disposes of the removed particles outside the separator.

Another object of the invention is to provide a separator of the above type which is reliable in operation but very inexpensively constructed.

A further object of the invention is to provide a separator of the above type which is particularly well adapted for removing dust and other particles from air.

Still another object of the invention is to provide a combination blower and separator, both of the centrifugal type, in which kinetic energy for actuating the separator is imparted directly from the blower without substantial loss thereof.

Before referring specifically to the drawings it will be well to outline briefly the basic theory of the present invention. In the curvilinear flow of air, liquid, or other fluid, it is well known that foreign particles contained therein, having a greater density than the fluid in which they are contained, tend to move toward the outside of the curved path of the fluid. It is also well known that when the fluid is moving circumferentially within a chamber or conduit, fluid having less than the average concentration of such foreign particles may be removed from the vortex or center of the circumferential path. Within the context of this basic framework the present invention has provided an entirely new method of removing the heavy foreign particles from the fluid.

The first premise of the invention is that the fluid, while circulating circumferentially within a conduit, is also caused to move lengthwise of the conduit in a direction perpendicular to its circumferential motion. Secondly, an obstruction or discontinuity such as a wall or other means is formed in the interior of the conduit, the nature of which is such that the circumferentially flowing fluid stream, upon encountering the discontinuity, is forced to follow a more sharply curved path. Third, a discharge port is formed in the conduit wall, prior to the obstruction or discontinuity, so that the moving fluid stream flows past the discharge port before encountering the obstruction or discontinuity.

In accordance with the invention it is also necessary that the discharge port be oriented substantially tangential to the circumference of the conduit, so as to readily accept a portion of the circumferentially flowing fluid stream. Furthermore, the discharge port is of limited size, being smaller than the inlet opening through which the fluid stream is introduced into the conduit.

The result of this arrangement is that, while the fluid stream is able to adjust itself to a more sharply curved path as required by the obstruction or discontinuity in the conduit, the particles contained within the fluid have much greater difficulty in making this adjustment. The foreign particles therefore tend to flow out through the discharge port taking with them a limited amount of fluid from the fluid stream.

On the output side of the obstruction or discontinuity the main portion of the fluid stream may be removed from the conduit substantially devoid of foreign particles.

The tendency of the fluid stream to discharge or precipitate particles therefrom at a point immediately prior to the discontinuity is substantially greater than this tendency at a point further removed from the discontinuity, the reason being that the dynamic reaction to the discontinuity is reflected upstream within the conduit but with a steadily diminishing intensity. The preferred location of the discharge port, therefore, is such as to coincide with the point of maximum dynamic reaction to the discontinuity. Another preferred feature of the invention is the use of a substantially cylindrical core member positioned approximately concentrically within the conduit.

The precise nature of the invention, and the objects and advantages thereof, will be more fully understood from the following description considered in conjunction with the accompanying drawings, in which:

FIGURE 3 is a transverse cross-sectional view of the main housing;

FIGURE 4 is a longitudinal cross-sectional view of the entire unit of FIGURE 1; and FIGURE 5 is a cross-sectional view of the first discharge port, taken on the line 5—5 of FIGURE 3.

Figure 1:
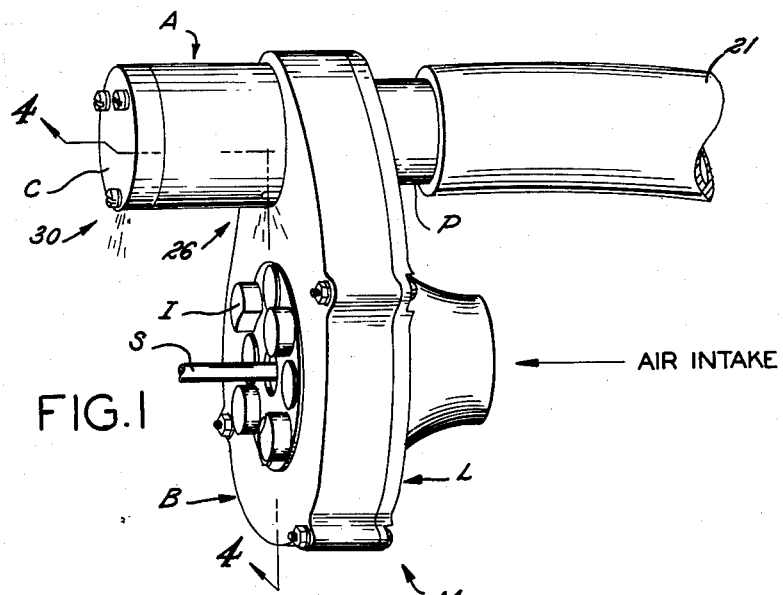
FIGURE 1 is a perspective view of the presently preferred form of a combination air blower and separator unit constructed in accordance with the invention.
Figure 2:
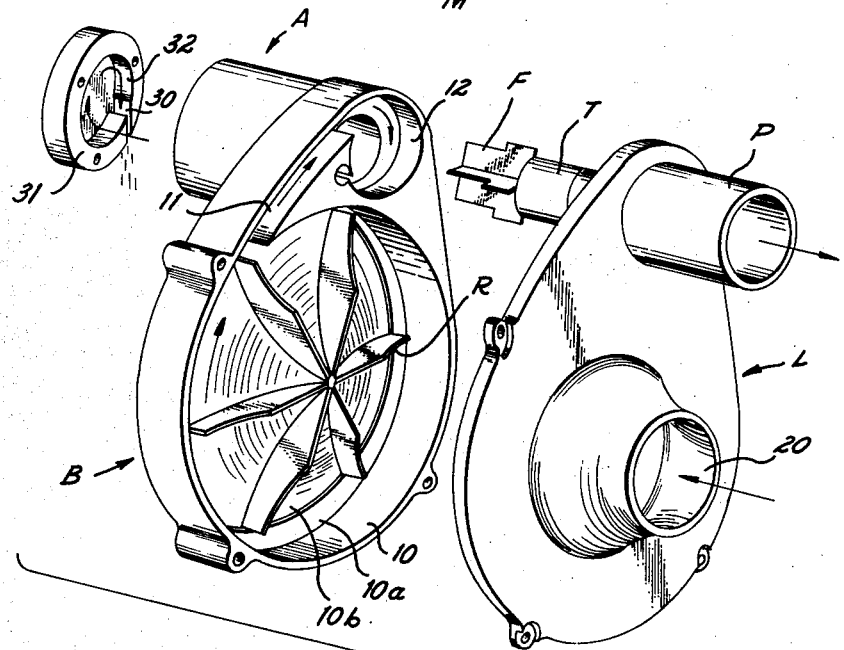
FIGURE 2 is an exploded perspective view of the device of FIGURE 1.

The presently preferred form of the invention will now be described generally with reference to the drawings. A main housing M includes a base member B and a lid member L. A thermal insulating plate I is carried on the back side of base member B, while a rotor R disposed within the main housing is carried on the end of a shaft S that extends through both the member B and plate I.

Base member B has formed therein a rotor chamber 10, a first separator chamber 12, and an interconnecting passageway 11. Rotor R is an impeller of the centrifugal type and is located within the rotor chamber 10. A small cylindrical auxiliary housing A extends from the back side of base member B, its interior providing a second separator chamber 13 which communicates with the first separator chamber 12 in longitudinal alignment therewith. A cover C is removably attached to the outer end of the auxiliary housing A.

An output pipe P protrudes perpendicularly from the front upper end of lid member L of the main housing. An interior tube T formed as a rearward extension of pipe P concentrically occupies chamber 12 and extends therebeyond to concentrically occupy a portion of the length of chamber 13. A set of four perpendicular fins F are secured within the outer end of tube T and extend outwardly to occupy most of the remaining portion of chamber 13.

In operation, the flow of air is as follows. The driven rotation of rotor R causes air to flow around the circumference of chamber 10 and thence through the tangentially extending passageway 11. This creates as suction in the center of the rotor chamber and causes air to flow inward through an inlet opening 20 that is centrally formed in lid member L. Passageway 11 not only provides a tangential exit from rotor chamber 10, but also provides a substantially tangential inlet flow axis to first separator chamber 12. The air circulates circumferentially within chamber 12 and then shifts to the left, as best seen in FIGURE 4, to flow in a helical path within chamber 13.

Within chamber 13 the air stream continues to follow a helical path, with its circumferential motion being greatly retarded, however, by the fins F. On striking the inner surface of cover C, at the end of chamber 13, the air stream reverses its direction and flows to the right, as seen in FIGURE 4, to again traverse the length of chamber 13. In the right-hand movement of the air stream the circumferential motion is substantially eliminated, however; the air is confined to the longitudinal center of chamber 13 that is broken into four distinct longitudinal segments by the fins F; and the air stream then enters the interior of tube T. The interior of tube T includes a first portion 15 of fixed diameter within which the ends of the fins are secured, providing a third separator chamber, and a second portion 16 of tapered diameter. After flowing through tube T the air stream then flows outward through the cylindrical interior 17 of pipe P and thence through an attached outlet hose 21.

The separation of heavy particulate material from the air is performed in two different stages. The first stage of separation occurs in chamber 12 in conjunction with the movement of the air into chamber 13. The second stage of separation occurs in chamber 13 in conjunction with the movement of the air into chamber 15.

Auxiliary housing A is in the form of a hollow cylinder with open ends, one end thereof being welded or otherwise suitably fastened to the back side of base member B, so that the chamber 13 is formed by the cylindrical interior of auxiliary housing A together with an aligned opening of equal diameter in the back plate of base member B.

Chamber 12 is not cylindrical but has a circumferential wall of a spiral configuration, as best seen in FIGURE 3. The end or bottom wall of chamber 12 is identified as 12a and is aligned with bottom wall 10a of rotor chamber 10 and bottom wall 11a of passageway 11. A first discharge port 25 opens into the circumferential wall of chamber 12 and provides a substantially tangential outlet flow axis. As best seen in FIGURE 5, discharge port 25 is a cylindrical bore formed parallel to the longitudinal axis of chamber 12 and which opens into the entire width of the circumferential edge of chamber 12. A smaller and concentric cylindrical bore 26 is formed, which extends through the remaining thickness of base member B, and provides a cut-away portion 26a on the outer surface of auxiliary housing A. It will be noted that the passageway 11 and discharge port 25 open into the chamber 12 at circumferentially adjacent, but separated, locations. The air discharged through passageway 11 is forced through a curved path of continuously smaller radius, due to the smooth continuous spiral formed by the outer edge wall of passageway 11 and the circumferential wall of chamber 12. As the air stream encounters the discharge port 25 there is a strong tendency for the particulate contained in the air stream to enter the discharge port. This tendency is increased by the fact that circumferential wall portion 23 of chamber 12, lying on the side of discharge port 25 closest to passageway 11, is located radially further inwardly than the circumferential wall portion 24 of the chamber on the opposite side of discharge port 25, from whence the air stream is coming. The result is that a substantial proportion of the particulate contained in the air stream, together with a limited quantity of the air itself, flows into the discharge port 25 and hence into the surrounding atmosphere.

It is significant that the radius of chamber 13 is smaller than the radius of chamber 12 at any point about the circumference of the latter, which fact accentuates the effectiveness of the separating action. Chamber 12 and chamber 13 together form a longitudinal conduit through which the air stream may flow, in a substantially helical path, and discharge port 25 is intentionally located in chamber 12, at a point immediately prior to the diminishment of the interior diameter of the conduit at the wall 12a containing an interior wall surface portion which extends abruptly inwardly to form an obstruction or discontinuity for a purpose to be hereinafter explained.

Throughout the description it is convenient to consider each "separation chamber" 12, 13, and 15 as a "conduit portion." Hence, the first separation stage takes place in a "conduit" consisting of first and second "conduit portions" respectively formed by the separator chambers 12 and 13.

A second stage of separation occurs when the air stream flows from chamber 13 into chamber 15. Cover C of auxiliary housing A has a concentric bore 32 formed therein, which is aligned with the open interior of auxiliary housing A and thus forms an end wall closure part of the cylindrical chamber 13. A slot 30 is formed in the circumferential wall 31 of the cover member, slot 30 being not aligned radially of the cover member but rather being approximately tangential to the circumference of the bore 32. The air stream moving circumferentially within the bore 32, at the end of chamber 13, tends to force particulate out of the slot 30, which thus provides a second discharge port.

In the second separating stage the chamber 13 and chamber 15 again provide a longitudinal conduit having a diminishment of its interior diameter. Again, the discharge port 30 is intentionally located immediately prior to the diminished interior diameter of the conduit. Although these two portions of the conduit occupy the same longitudinal space, and require a reversal of the direction of air flow with respect to the longitudinal axis of the conduit, nevertheless the effect upon the air stream is substantially the same as if the physical structure of the conduit continued in one longitudinal direction with an abrupt diminishment of interior diameter at the end wall formed by the cover C, and in which an interior wall surface portion extends abruptly inwardly to form an obstruction or discontinuity in the same manner and for the same purpose as the surface portion of wall 12a.

While two different separating stages are illustrated herein it will be readily appreciated that in accordance with the invention three or more separating stages may be used, or that a single separating stage may be employed. Furthermore, while a wall structure providing an abrupt diminishment of interior diameter is illustrated in both separating stages herein, any other type of obstruction or discontinuity may be used, so long as the circumferentially flowing fluid stream upon encountering the obstruction or discontinuity is forced to follow a more sharply curved path. In accordance with the invention it is essential that the discharge port be located on the inlet side of the obstruction or discontinuity, and preferably immediately adjacent thereto.

It will be readily understood that separating action may be obtained by employing a longitudinally extending conduit into which an air or other fluid stream is introduced to flow in a helical path, about the interior wall surface of the conduit, and that a number of discharge ports may be formed in the conduit wall throughout its length. However, the loss of pressure from a number of discharge ports might be excessive, and the separating efficiency would also be less than desired. The present invention is based on recognition of the fact that an obstruction or discontinuity that forces the circumferentially flowing fluid stream to follow a more sharply curved path also reflects a dynamic reaction to the immediately preceding portion of the fluid stream, just prior to the obstruction or discontinuity, with the result that a discharge port located there is of maximum effectiveness for separating heavy particulate from the fluid stream, while minimizing the kinetic energy loss.

Referring specifically now to the base member B of main housing M, this part is preferably formed as a single casting. The rotor chamber 10 is approximately cylindrical, with its outer circumferential wall having a smooth spiral configuration which leads into the outer wall of the tangentially extending passageway 11. Separator chamber 12 and rotor chamber 10 have their longitudinal axes disposed parallel to each other, and are substantially aligned with their interconnecting passageway 11 in a direction perpendicular to their longitudinal axes. One advantage of this construction is that the kinetic energy imparted to the air stream by rotor R reaches the separator chamber 12 substantially undiminished. Another advantage is that a certain amount of separation of particulate from the circumferentially moving air stream occurs, by centrifugal action, within rotor chamber 10. The air stream and particulate enter the passageway 11 in partially separated form, traverse its length while retaining their partial separation, and then enter the chamber 12. The degree of separation obtained in chamber 12 and discharge port 25 is, therefore, greater than if the air stream were introduced into chamber 12 with no prior separation of the particulate. In this connection it is significant to note that the inner wall surface 11b of passageway 11 enters chamber 12 tangential to the circumference of chamber 13, while the passageway outer wall surface 11c forms a continuing spiral with the circumferential wall of chamber 12. Thus, as the air stream flows about its circumferential path within chamber 12 it is pushed across the wall of chamber 13 into chamber 13 in a smoothly progressive manner.

Rotor R includes a backplate 18 and radial blades 19, preferably integrally formed. Bottom wall 10a of rotor chamber 10 has a countersunk circular portion 10b that accommodates rotor backplate 18, thus ensuring that air delivered to the passageway 11 flows smoothly from the surface of backplate 18 to bottom surface 11a of the passageway.

The presence of fins F does not increase the separation efficiency but actually diminishes it. It is desirable, however, for the air stream flowing in outlet hose 21 to flow in a completely longitudinal direction with little or no component of circumferential velocity. The fins F, by straightening up the longitudinal flow pattern, diminish the effective dynamic resistance to air flow of the blower and separator apparatus, and therefore provide a higher output of air than would otherwise be obtained. It will be appreciated that if separation alone were of interest the fins F would be omitted and interior tube T would be extended out with its outer end lying closer to the discharge port 30.

In a particular application in which the illustrated embodiment of the invention is used it is desirable to supply a certain amount of static pressure, as well as longitudinal velocity, to the air stream entering outlet hose 21. For that reason the interior tube T has a tapered diameter portion 16 within chamber 12, providing a smooth transition between the interior diameters of chamber 15 and of outlet pipe P. It is actually preferred, however, that pipe P continue the taper, so that the transverse cross-sectional area of the pipe at its outlet end is at least twice that of the chamber 15.

The particular operating position of the invention may have some influence on its separating efficiency, because of the effect of gravity in aiding or opposing the centrifugal forces. This factor is believed to be negligible, however, since the centrifugal forces are preferably several hundred or a thousand times the force of gravity.

The present invention is substantially more effective than most mechanical separators both in the percentage of total particulate material which is removed and also the percentage of small particles that are removed. In actual tests made with the preferred embodiment of the invention, as illustrated and described herein in detail, silica dust was injected into the air stream. The size of the dust particles ranged from over 50 microns to submicron size. Of the total quantity of dust injected, 39% of the total weight consisted of particles of less than 5 microns in diameter, and 7% by weight consisted of particles of less than 1 micron in diameter. In a series of tests made by injecting this material into the air stream it was found that the blower and separator unit of the present invention removed from a minimum of 93% to a maximum of 96% by weight of the total quantity of dust. Thus, a substantial portion of dust particles of less than 1 micron in diameter were successfully removed.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

I claim:

1. A combined blower and separator comprising, in combination: an integrally formed substantially flat base member having an open face in which are formed an approximately cylindrical rotor chamber, an approximately cylindrical separator chamber, and an interconnecting passageway, said chambers having their longitudinal axes parallel and being substantially aligned with said passageway in a direction perpendicular to the direction of their longitudinal axes, each end of said passageway opening into the corresponding chamber tangentially to the circumference thereof and cooperating with the associated chamber wall to form a smooth spiral wall surface on the outer edge of said passageway; a shaft journaled in the wall of said base member and projecting into said rotor chamber; a centrifugal rotor disposed within said rotor chamber and carried on the end of said shaft; a lid member removably attached to said face of said base member so as to enclose said chambers and said passageway, said lid member having an air inlet opening formed therein at the center of said rotor chamber; means coupled to said base member providing a longitudinal conduit portion contiguously adjoining said separator chamber as a longitudinal extension thereof, the interior wall surface extending abruptly inwardly to provide an interior diameter decrease at the point of passing from said separator chamber to said conduit portion, a discharge port being formed in the circumferential wall of said separator chamber; and an air outlet opening provided at the end of said conduit portion remote from said abruptly inwardly extending wall surface; the action being such that velocity developed in the air stream flowing circumferentially within said rotor chamber is transmitted substantially undiminished through said passageway into said separator chamber whereby heavy particulate separated by centrifugal force from said air stream is discharged through said discharge port together with a limited amount of air.

2. Apparatus as claimed in claim 1 wherein said discharge port is circumferentially adjacent, but separated from, the opening of said passageway into said separator chamber, and the circumferential wall surface of said separator chamber forms a smooth spiral that extends around the greater part of the circumference thereof, with decreasing radius, from the side of said passageway opening farthest from said discharge port to the side of said discharge port farthest from said passageway opening.

3. Apparatus as claimed in claim 2 which additionally includes a substantially cylindrical core member concentrically disposed within said separator chamber and said conduit portion.

4. Apparatus as claimed in claim 3 in which said conduit remote end is closed, a second discharge port is formed in said conduit wall adjacent said closed end thereof, said core member has an open end spaced away from said closed end of said conduit, and said core member has a hollow interior which provides said air outlet opening.

5. Apparatus as claimed in claim 4 which further includes a set of radial fins secured within the open end of said core member and extending longitudinally within said conduit toward said closed end thereof.

6. A combined blower and separator comprising, in combination: a housing having a rotor chamber, a first separator chamber, and an interconnecting passageway formed therein, said housing also having air inlet means for said rotor chamber; a centrifugal rotor drivingly disposed within said rotor chamber, one end of said passageway opening tangentially into the outer circumferential portion of said rotor chamber and the other end thereof opening tangentially into the outer circumferential portion of said first separator chamber whereby air velocity developed within said rotor chamber reaches said first separator chamber substantially undiminished; a tube supported from said housing and disposed in the center of said first separator chamber transverse to said passageway, said tube and first separator chamber cooperatively defining a circumferentially extending air path that provides a continuation of the associated end of said passageway but with continuously diminishing cross-sectional area, one end of said tube cooperating with said housing to fully enclose one side of said circumferential air path; an auxiliary housing supported from said housing and defining a second separator chamber that is of cylindrical configuration and concentrically aligned with said tube, one end of said second separator chamber opening into the other side of said circumferential air path of said first separator chamber, the other end of said tube being extended concentrically into said one end of said second separator chamber, the interior diameter of said second separator chamber being greater than the exterior diameter of said tube but being less than the interior diameter of the smallest radius portion of said first separator chamber; a set of radial fins secured within said tube extension and extending longitudinally outwardly therefrom to occupy the greater portion of the remaining length of said second separator chamber; means closing the other end of said second separator chamber whereby the air stream generated within said rotor chamber and flowing through said passageway into said circumferential air path of said first separator chamber, is caused to then move in a helical path through the length of said second separator chamber, to rebound from said closed end of said second separator chamber, and to flow through said fins into said tube extension and tube, the effect of said fins being to substantially eliminate the circular motion of said air stream and transform the same into linear motion parallel to the longitudinal axis of said tube; an air outlet pipe forming an extension of said one end of said tube; a first discharge port formed in the outer circumferential wall of said first separator chamber adjacent the end of said circumferential air path most circumferentially remote from said passageway; and a second discharge port formed in the outer circumferential wall of said second separator chamber adjacent said closed outer end thereof; said discharge ports being operable for discharging heavy particulate materal, together with a limited amount of air, from said air stream into the surrounding atmosphere.

References Cited in the file of this patent

UNITED STATES PATENTS

| 409,482 | Morse | Aug. 20, 1889 |
| 604,871 | Allington | May 31, 1898 |
| 1,937,095 | Prat | Nov. 28, 1933 |
| 2,039,692 | Van Tongeren | May 5, 1936 |
| 2,647,487 | Macan | Aug. 4, 1953 |
| 2,676,667 | Dodge | Apr. 27, 1954 |
| 2,738,855 | Fallon et al. | Mar. 20, 1956 |

FOREIGN PATENTS

| 643,876 | France | May 22, 1928 |
| 742,219 | France | Dec. 27, 1932 |